United States Patent [19]

Dauben et al.

[11] 3,783,945
[45] Jan. 8, 1974

[54] REMOVING WATER FROM OIL-PRODUCING FORMATIONS
[75] Inventors: Dwight L. Dauben; H. R. Froning, both of Tulsa, Okla.
[73] Assignee: Amoco Production Company, Tulsa, Okla.
[22] Filed: Jan. 5, 1972
[21] Appl. No.: 215,660

[52] U.S. Cl. .............................................. 166/305
[51] Int. Cl. ...................... E21b 43/16, E21b 43/25
[58] Field of Search .................... 166/305, 312, 273, 166/274

[56] References Cited
UNITED STATES PATENTS

| | | | |
|---|---|---|---|
| 3,373,809 | 3/1968 | Cooke, Jr. .......................... | 166/273 |
| 3,343,597 | 9/1967 | Gogarty et al. ..................... | 166/273 |
| 3,444,930 | 5/1969 | Williams et al. .................... | 166/273 |
| 3,554,288 | 1/1971 | Ross .............................. | 166/305 R |

Primary Examiner—Marvin A. Champion
Assistant Examiner—Jack E. Ebel
Attorney—Arthur McIlroy

[57] ABSTRACT

Water is removed from the portion of an oil-producing formation near a producing well. A micellar solution is used for this purpose. The solution may be a water-free concentrate or it may contain water. When the salt content of water in the well and in the formation is between about 20,000 and about 100,000 parts per million by weight, the formation of objectionable emulsions may occur. The severity of this problem is decreased by injecting a batch of low-viscosity substantially aliphatic hydrocarbon liquid ahead of the micellar solution. In some cases, such as where very highly saline brines are present, the aliphatic hydrocarbon liquid may be preceded by a small batch of water containing little, if any, salt. The aliphatic hydrocarbon liquid may also be preceded by an aromatic hydrocarbon liquid or other solvent to dissolve organic deposits, such as paraffin, asphaltenes, and the like. Use of the aliphatic hydrocarbon liquid is also advantageous, even when low-salinity brine is present.

11 Claims, No Drawings

REMOVING WATER FROM OIL-PRODUCING FORMATIONS

Many methods have previously been proposed to remove water from the portion of an oil-producing formation immediately around an oil-producing well. One method has employed a micellar solution. This material has also been called other things, such as a micellar dispersion, microemulsion, a transparent emulsion, and a soluble oil. The term "micellar solution" will generally be used in the following description. Variations of this process are described in U.S. Pat. No. 2,342,106 Jones et al; U.S. Pat. No. 2,356,205 Blair et al; U.S. Pat. No. 3,470,958 Kinney et al; U.S. Pat. No. 3,554,288 Ross; and U.S. Pat. No. 3,554,289 Webb.

The water may sometimes be present as a waterblock in the formation. Sometimes, it may be present as a water cone. At still other times, water may be present as an emulsion. In all cases, the problem is to remove water from the formation near the well bore.

One problem with micellar solutions has been the salt content of the water phase. The solutions become unstable at salt concentrations much above about 15,000 or 20,000 parts per million by weight in the aqueous phase. This is due principally to the low solubility of high salinity brines in the micellar solutions. Emulsion tend to form between the free water and the water-saturated micellar solution. These emulsions frequently have very high viscosities.

In a waterflooding operation, the salt problem can be easily overcome by simply injecting fresh water or water with a low salt content into the formation ahead of the micellar solution. Thus, the micellar solution contacts only the low-salinity water with which the micellar solution is miscible. In a process for removing water from around an oil-producing well, however, there is understandable reluctance to inject water if this step can be avoided. The problem is too much water already in the formation, so it would seem to make little sense to inject more.

On the other hand, in a water-removal process, the micellar solution does not move very far through the formation and does not remain in the formation for a very long time. Therefore, less stability and high viscosities can be tolerated than in the case of secondary recovery operations. When the micellar solution contacts highly saline brines in a water-removal process, however, the stability and viscosity may not even be suitable for water-removal purposes.

High viscosities and poor efficiency of water removal can also result if the oil naturally present in the formation has a viscosity over about 100 centipoises. The problem is particularly severe when both the difficulties of high oil viscosity and of high brine salinity are present.

Still another problem with use of micellar solutions to remove water from oil-bearing formations has been mixing of the micellar solution with water in the well bore. Even though a well is pumped off before a micellar solution is injected, the bottom of the well usually still contains several feet of water. Mixing of this water with the micellar solution may so nearly saturate the solution with water that there is little capacity to dissolve more water in the formation. If the micellar solution becomes saturated with water in the well bore, the resulting solution is not even miscible with water so it cannot even miscibly displace water in the formation to a distance from the well bore. This problem of mixing with water in the well bore is present whether the oil is viscous and the brine has a high salinity or not. However, the problem is much more serious in case of high salinity brines.

With the above problems in mind, an object of this invention is to provide a water-removing process for oil-producing formations, the process using a micellar solution or concentrate, but providing improved effectiveness of the process. A more specific object is to provide such an improved process when the salinity of the brine in the formation and in the bottom of the well exceeds about 20,000 parts per million. Still another object is to provide an improved process for treating a formation containing a viscous oil. Still other objects will be apparent to those skilled in the art from the following description and claims.

SUMMARY OF THE INVENTION

We have found that the process using micellar solutions to remove water from the portion of oil-producing formations near well bores can be improved by preceding the micellar solution with a batch of low-viscosity substantially aliphatic hydrocarbon liquid, such as kerosene. The hydrocarbon liquid displaces at least a portion of the brine from the bottom of the well back into the water-bearing zones of the formation. It also displaces brine in the formation from the zone near the well bore. The distance to which the micellar solution can be injected before becoming saturated with water is greatly increased in this way. Serious problems of separation and high viscosity near the well are thus avoided. The low-viscosity substantially aliphatic hydrocarbon liquid also displaces the natural crude oil away from the well, decreasing contact of the micellar solution with this oil and possible adverse effects due to high viscosity, natural emulsifying agents, and the like.

The principles of the process can be most easily demonstrated by rather simple laboratory tests. In these tests, a micellar solution concentrate was used having the composition shown in Table I.

TABLE I

| Ingredient | Percent by Weight |
| --- | --- |
| Kerosene | 65.1 |
| "Sulfonate" | 27.9 |
| Ethoxylated hexanol | 6.0 |
| Fusel oil | 1.0 |

The term "sulfonate" is placed in quotation marks in the Table since the material is an impure, commercial product of somewhat variable composition containing about 58 to 70 percent sodium petroleum sulfonate, 30 to 40 percent mineral oil, and 2 to 3 percent inorganic salts, all percentages being by weight. The sodium petroleum sulfonate has an average molecular weight varying between about 430 and about 470.

The ethoxylated hexanol is the reaction product of about 6 moles of ethylene oxide with 1 mole of hexanol.

This concentrate, shown in Table I, is described in more detail and claimed in U.S. Patent application Ser. No. 38,366, filed by Gilliam et al, on May 18, 1970.

The term "concentrate" is used herein to indicate a water-free composition, such as that shown in Table I. The term "micellar solution" is sometimes used to indicate a water-containing composition. It should be noted, however, that in the water-free concentrate the surface-active agents are thought to be present in the form of micelles. Therefore, the water-free concentrates themselves are actually micellar solutions. There is some uncertainty in this field, but, for purposes of this description and claims, the term micellar solution is used in a broad sense to include both water-free concentrates and water-containing micellar solutions.

In general terms, the preferred micellar solution for our process is a transparent micellar solution having the following composition.

The oil phase should be a low viscosity substantially aliphatic aliphatic hydrocarbon liquid.

The water phase should have a salt content of from about 6,000 to about 15,000 parts per million by weight.

The principal surfactant should be a petroleum alkali metal sulfonate having an average molecular weight of from about 425 to about 575.

The cosurfactant should be a mixture of a two to 12 mole ethylene oxide adduct of a primary unsubstituted monohydric alcohol having from four to 10 carbon atoms and an unsubstituted monohydric oil-soluble alcohol having from four to six carbon atoms.

The weight ratio of principal surfactant to the mixed cosurfactants should be from about 2.5:1 to about 10:1. The weight ratio of the ethylene oxide adduct to oil-soluble alcohol should be from about 1:1 to about 9:1.

As explained later, for our purposes the oil content should be at least about 50 percent of the weight of the water-free concentrate. The water content of the micellar solution should preferably be from about 10 to a little over 100 percent of the volume of the water-free concentrate.

The concentrate of Table I was selected for the tests because it is one with which we have had considerable experience and is one which tolerates a wider range of salt concentrations in any water phase than many other micellar solutions. Some other micellar solutions have a somewhat wider salt concentration tolerance, but these are, in general, too expensive for widespread field use. Many advantages are described herein for various process steps using the concentrate of Table I as an example of a micellar solution. A little study will show that these same advantages are also obtained when using other micellar solutions for removing water from the portion of an oil-bearing formation near a well.

In the laboratory tests, the concentrate of Table I was shaken with brines or with additional hydrocarbons and brines, the resulting compositions then being observed for stability and viscosity. Results are reported in Table II.

The added oil was Stoddard solvent in every case. This is a narrow-boiling petroleum fraction boiling predominantly from about 350° F to about 390° F.

Immediately after shaking, only five samples formed clear solution. All others were opaque emulsions. When the emulsions were permitted to stand, oil and water phases separated. In some cases, separation took place in only a few minutes. In others, several hours were required. In Test 3, separation was not complete in 24 hours. After setting for 24 hours, the amount of settled water phase was measured. This is reported in Table II in the fourth column from the right. This amount of water was then subtracted from the amount added to determine the amount and percent dissolved. These values are also reported in Table II. The most important values in Table II appear to be in the last column. These are the milliliters of the various brines dissolved by 1 milliliter of the micellar solution concentrate. Obviously, the micellar solution concentrate dissolves only a very limited amount of highly salty water, the amount dissolved decreasing with increasing salinity in the brine.

A qualitative estimate of viscosity of the emulsions was made by shaking air into the emulsions and observing the rate of rise of small bubbles. The emulsions can be divided into 3 groups on the basis of viscosity. One group includes Tests 1, 8, 9, 15 and 16. These actually were not emulsions, but were clear non-viscous solutions. On the other extreme, are Tests 3 to 7, inclusive. In these tests, the emulsions were so viscous that emulsion troubles in the formation could be expected in most cases. In all other tests, emulsions formed but did not seem sufficiently viscous to cause much trouble from the standpoint of viscosity alone. It should be noted again, however, that the formation of two phases is usually undesirable whether the emulsion is viscous or not. If it is desired to dissolve water, but the water comes out of solution, that is, of course, undesirable.

Summarizing the results of the tests reported in Table II, if the salinity of formation brines is over about 20,000 parts per million by weight, the micellar solution concentrate will dissolve only a very limited amount of the brine before becoming saturated. A separate water phase is then present, which may form viscous emulsions with the micellar solution. The resulting micellar solution obviously is not miscible with water. This means that when the micellar solution concentrate is used to remove highly saline brines from formations, the concentrate can take up little water from the formation before forming an emulsion which may be sufficiently viscous to cause trouble. It also means that a

TABLE II

| Test No. | Micellar solution | | | | Water layer, ml. | Water dissolved* | | |
|---|---|---|---|---|---|---|---|---|
| | Volume conc., ml. | Added oil vol., ml. | Added water | | | Ml. | Percent | Per ml. conc. |
| | | | Salt, p.p.m. | Vol., ml. | | | | |
| 1 | 5 | 0 | 10,000 | 5 | 0 | 5 | 100 | 1.0 |
| 2 | 5 | 0 | 20,000 | 5 | 0.8 | 4.2 | 84 | 0.84 |
| 3 | 5 | 0 | 30,000 | 5 | *3.1 | 1.9 | 38 | 0.38 |
| 4 | 5 | 0 | 40,000 | 5 | 3.2 | 1.8 | 36 | 0.36 |
| 5 | 5 | 0 | 60,000 | 5 | 3.8 | 1.2 | 24 | 0.24 |
| 6 | 5 | 0 | 80,000 | 5 | 4.2 | 0.8 | 16 | 0.16 |
| 7 | 5 | 0 | 100,000 | 5 | 4.3 | 0.7 | 14 | 0.14 |
| 8 | 5 | 2 | 10,000 | 3 | 0 | 3.0 | 100 | 0.60 |
| 9 | 5 | 2 | 20,000 | 3 | 0 | 3.0 | 100 | 0.60 |
| 10 | 5 | 2 | 30,000 | 3 | 1.1 | 1.9 | 63 | 0.38 |
| 11 | 5 | 2 | 40,000 | 3 | 1.5 | 1.5 | 50 | 0.30 |
| 12 | 5 | 2 | 60,000 | 3 | 2.0 | 1.0 | 33 | 0.20 |

TABLE II—Continued

| Test No. | Micellar solution | | Added water | | Water layer, ml. | Water dissolved* | | |
|---|---|---|---|---|---|---|---|---|
| | Volume conc., ml. | Added oil vol., ml. | Salt, p.p.m. | Vol., ml. | | Ml. | Percent | Per ml. conc. |
| 13 | 5 | 2 | 80,000 | 3 | 2.3 | 0.7 | 23 | 0.14 |
| 14 | 5 | 2 | 100,000 | 3 | 2.4 | 0.6 | 20 | 0.12 |
| 15 | 5 | 2.5 | 10,000 | 2.5 | 0 | 2.5 | 100 | 0.50 |
| 16 | 5 | 2.5 | 20,000 | 2.5 | 0 | 2.5 | 100 | 0.50 |
| 17 | 5 | 2.5 | 30,000 | 2.5 | 0.5 | 2.0 | 80 | 0.40 |
| 18 | 5 | 2.5 | 40,000 | 2.5 | 1.0 | 1.5 | 60 | 0.30 |

*0.8 water, 2.3 emulsion.

water-saturated micellar solution cannot miscibly displace water in the formation.

If the micellar solution concentrate is preceded by a batch of a low-viscosity petroleum kerosene, such as kerosens, Stoddard solvent, or the like, however, at least some of the brine is displaced from the formation near the well bore. If the well produces water, the water remaining in the bottom of the well is displaced into the water-bearing zones and does not tend to saturate the micellar solution in the well bore. This permits a given volume of micellar solution concentrate to be injected farther into the formation before it becomes saturated and forms an emulsion with a separate water phase. The technique is most important with very high salinity brines where the solubility of the brine in the micellar solution is very low.

The nature of oil used to prepare the micellar solution concentrate or to precede this concentrate into the formation can be important. Some effects of changing the nature of oil in the micellar solution are shown in Table III.

TABLE III

| Test No. | OIL | Salt Conc. PPM | Water Layer, ML | ML. | Water Dissolved % | Per ML. Conc. |
|---|---|---|---|---|---|---|
| 9 | Stoddard | 20,000 | 0 | 3.0 | 100 | 0.60 |
| 19 | Lub. Oil | 20,000 | 8.6 | | | |
| 20 | 50% Lub. Oil 50% Stoddard | 20,000 | 0 | 3.0 | 100 | 0.60 |
| 10 | Stoddard | 30,000 | 1.1 | 1.9 | 63 | 0.38 |
| 21 | 50% Lub. Oil 50% Stoddard | 30,000 | 0.8 | 2.2 | 73 | 0.44 |
| 11 | Stoddard | 40,000 | 1.5 | 1.5 | 50 | 0.30 |
| 22 | Lub. Oil | 40,000 | 1.2 | 1.8 | 60 | 0.36 |
| 23 | 50% Lub. Oil | 40,000 | 1.4 | 1.6 | 53 | 0.32 |

In all the tests of Table III, the beginning concentrate was that shown in Table I. In Table III, the mixtures all used 50 percent of this concentrate, 20 percent of the indicated oil, and 30 percent of the indicated brine. In all cases, the salt used to prepare the brines are sodium chloride. Tests 9, 10 and 11 of Table II are repeated in Table III for comparison. The lubricating oil used was a very low detergent 20 weight oil having a viscosity of about 165 centipoises at about 75° F. (Reading on a Fann viscosimeter rotating at 300 RPM.)

Use of the viscous lubricating oil seemed to produce a slight increase in water-dissolving ability in most cases. In the case of Test 22, this advantage was more than overcome by an increase in viscosity into the range which would be expected to cause trouble in many cases. No other emulsions seemed sufficiently viscous to cause much trouble in most cases.

Results in Test 19 are not understood. In this case, the lower phase was the largest, leaving a small layer, 1.4 milliters, on top. This may indicate an inversion of the micellar solution to a water-external system with a layer of oil floating on top. The problem was not thoroughly investigated, since it was apparent that oils as viscous as lubricating oils should be avoided, if possible. It should be noted again that if a viscous oil is naturally present in the formation, an additional advantage of the oil spearhead preceding the concentrate is that it prevents mixing of the viscous oil into the micellar solution with possible adverse effects.

While the nature of the added oils in the tests of Table III are noted in the Table, it should be pointed out that the concentrate itself contained about 65 percent kerosene, so the kerosene concentration in the ultimate micellar solution was 32.5 percent. This is a greater amount than that of the other oils used in Table III, so the nature of the kerosene controlled, to a large degree, the nature of the micellar solutions.

An effort was made to avoid this effect by preparing a new concentrate using heptane instead of kerosene as the oil. The composition was the same as that of Table I substituting heptane for the kerosene. The results of tests using this concentrate are shown in Table IV.

From the results in Table IV, it seems that substituting heptane for kerosene in the concentrate produced little differences, except that the heptane emulsions seemed somewhat more stable. The viscosities in Tests 24 and 25 were about the same as in Tests 3 and 4 in spite of the somewhat smaller viscosity of the heptane. Possibly, this should be expected since the viscosity of kerosene itself is quite low.

It would seem that the oil used for preparing the micellar concentrate or to precede this concentrate into the formation should have a viscosity below about 100 centipoises and preferably below about 10 centipoises to avoid some of the difficulties which can occur with move viscous oils. Very light oils having a flashpoint below about 80° F should usually be avoided to eliminate fire hazards. Otherwise, data in the above tables indicate few limitations on the nature of the oil to be used. One limited factor which has been previously recognized is the effects of aromatic hydrocarbons on the stability of micellar solutions. To avoid these problems, an oil having no more than about 5 percent by volume of aromatics should be used. The term "substantially aliphatic hydrocarbon liquid" is used herein to mean an oil having less than about 5 percent of aromatic hydrocarbons. Many crude oils meet these requirements and may be used instead of a more expensive refined petroleum fraction.

Some conclusions on the amount of oil to use in the concentrate can be drawn from Table II. Increasing the oil-to-water ratio seems to cause only minor decreases

TABLE IV

| Test No. | Oil in concentrate | Salt conc., p.p.m. | Water layer, ml. | Emulsion layer, ml. | Water dissolved* Ml. | Percent | Per ml. conc. |
| --- | --- | --- | --- | --- | --- | --- | --- |
| 3 | Kerosene | 30,000 | 0.8 | 2.3 | 1.9 | 38 | 0.38 |
| 24 | Heptane | 30,000 | 0.65 | 2.1 | 2.25 | 45 | 0.45 |
| 4 | Kerosene | 40,000 | 3.2 | 0 | 1.8 | 36 | 0.36 |
| 25 | Heptane | 40,000 | 2.65 | .65 | 1.7 | 34 | 0.34 |

*Calculated assuming emulsion layer all water.

in the amount of water which is dissolved, but does decrease the viscosity of any emulsion which may form. This may be simply the effects of reducing the concentrations of surfactants in the diluted micellar solution.

Tests were also made using less oil than that present in the concentrate of Table I. The composition of this concentrate is presented in Table V.

TABLE V

| Ingredient | Percent by Weight |
| --- | --- |
| Kerosene | 50 |
| "Sulfonate" | 40 |
| Ethoxylated hexanol | 8.6 |
| Fusel Oil | 1.4 |

Mixing this concentrate with brines, the results of Table VI were obtained.

TABLE VI

| Test No. | Concentrate Type | Volume | Salt conc., p.p.m. | Vol., ml. | Added oil, ml. | Ratio oil: water | Water dissolved Vol., ml. | Per gram surfactant |
| --- | --- | --- | --- | --- | --- | --- | --- | --- |
| 3 | Table I | 5 | 30,000 | 5 | 0 | 0.65 | 1.9 | 1.19 |
| 26 | Table V | 5 | 30,000 | 5 | 0 | 0.50 | 5.0 | 2.50 |
| 4 | Table I | 5 | 40,000 | 5 | 0 | 0.65 | 1.8 | 1.03 |
| 27 | Table V | 5 | 40,000 | 5 | 0 | 0.50 | 3.3 | 1.65 |
| 11 | Table I | 5 | 40,000 | 3 | 2 | 1.25 | 1.5 | 0.86 |
| 28 | Table V | 5 | 40,000 | 3 | 2 | 1.50 | 2.9 | 1.45 |

The results of Table VI with those of Table II indicate the concentrate should contain at least about 50 percent of a substantially aliphatic hydrocarbon liquid if high viscosities are to be avoided. This is particularly true if the concentrate contacts sufficient brine in the formation to form two phases and an emulsion.

Low-salinity water may be added to the micellar solution concentrate before the concentrate is introduced into the formation. Low-salinity water may also precede the oil into the formation. There are several reasons for this, depending upon the circumstances. One of the reasons is to reduce the effects of multivalent cations, such as calcium. The effect of calcium ions on brine solubility is shown in Table VII.

TABLE VII

| Test No. | Vol. conc., ml. | Added oil vol., ml. | Added water Salt Type | P.p.m. | Vol., ml. | Water layer | Water dissolved Vol., ml. | Per ml., conc. |
| --- | --- | --- | --- | --- | --- | --- | --- | --- |
| 2 | 5 | 0 | NaCl | 20,000 | 5 | 0.8 | 4.2 | 0.84 |
| 29 | 5 | 0 | 90% NaCl 10% CaCl₂ | 20,000 | 5 | 1.9 | 3.1 | 0.62 |
| 4 | 5 | 0 | NaCl | 40,000 | 5 | 3.2 | 1.8 | 0.36 |
| 30 | 5 | 0 | 90% NaCl 10% CaCl₂ | 40,000 | 5 | 3.4 | 1.6 | 0.32 |
| 9 | 5 | 2 | NaCl | 20,000 | 3 | 0 | 3.0 | 0.60 |
| 31 | 5 | 2 | 90% NaCl 10% CaCl₂ | 20,000 | 3 | 0.5 | 2.5 | 0.50 |
| 11 | 5 | 2 | NaCl | 40,000 | 3 | 1.5 | 1.5 | 0.30 |
| 32 | 5 | 2 | 90% NaCl 10% CaCl₂ | 40,000 | 3 | 2.05 | 0.95 | 0.19 |

Results in Table VI indicate that the relationship between surfactants, water and oil becomes more complex as the concentrations of surfactants are increased and the concentrations of oil and water are decreased. The general tendency seems to be a rapid increase in the amount of dissolved brine per gram of surfactant as the surfactant concentration increases and as the oil-to-water ratio decreases. In Tests 26, 27 and 28, the viscosities were somewhat greater than in Tests 3, 4 and 11, which used less surfactants. This was true even for Test 26 where there was only a single phase. Therefore, the advantage of greater water removal with higher surfactant concentrations is at least partly offset by the greater viscosity.

Reduced solubility of water in the concentrate in the presence of calcium ions is apparent from the data of Table VII. Viscosity problems were not greatly increased, but did appear to be somewhat worse.

Water substantially free from calcium ions may be added to the concentrate before this concentrate is introduced into the formation. When the resulting micellar solution contacts calcium-containing brine and absorbs it, the water already present dilutes the calcium ions and reduces their effects. The same is true if the low-salinity water is injected ahead of the concentrate, or preferably before the oil which precedes the concentrate.

There are other advantages to including at least a little water in the concentrate before it is injected. One advantage is that the added water can be closely controlled in composition to form a stable micellar solution. Thus, complete reliance need not be placed on forming a stable water-containing micellar solution upon absorbing water in the formation. If the salinity of water in the formation is either below about 3,000 parts per million or above about 20,000 parts per million by weight, a rather unstable micellar solution may be formed. Thus, if formation water has a low salinity of 1,000 to 2,000, for example, brine having a salinity of about 12,000 parts per million can be used to prepare the micellar solution to be introduced into the well. This brine forms a very stable micellar solution. It can absorb a large volume of the low-salinity formation water before the salinity of the water phase drops into a range causing instability of the micellar solution.

If the salinity of formation water is above about 20,000 parts per million, then the brine added to the concentrate should have a salinity of only about 6,000 parts per million, or even less for example. The resulting micellar solution is stable and can absorb a considerable volume of the high-salinity formation brine before the salinity of the water phase rises above about 20,000 parts per million with resulting micellar solution instability.

In order to assure micellar solution stability, the added water should preferably contain between about 6,000 and about 15,000 parts per million by weight of salts.

There is still another advantage of adding brine to the concentrate to form a water-containing micellar solution before injection into the well. This is the increased volume of treating solution. This large volume of solution treats a greater volume of the oil-bearing formation around the well. Of course, either the concentrate or micellar solution absorbs some water from the formation. There is a tendency, however, for the concentrate, or other micellar solution, to miscibly displace the water rather than absorbing it. Thus, the volume of a concentrate may not increase as much as desired. Adding some water to start with insures a somewhat greater volume of treating solution.

Of course, the volume of added water should be kept rather low, since one of the principal objects of the process is to absorb water from the formation. A volume about 20 to 30 percent of the volume of concentrate is usually preferred, although in unusual cases the volume of added brine may actually slightly exceed the volume of concentrate.

One of the principal advantages of the spearhead of substantially aliphatic hydrocarbon liquid is to avoid mixing of the injected treating solution with water in the well. Deliberate mixing of water with the solution before injection into the well might seem to be inconsistent with this object. The difference is that the amount and salinity of water introduced before injection are carefully controlled, while the amount and salinity of water in the well are not. Addition of the closely controlled brine before injection permits mixing with a considerable amount of brines of uncontrolled or even unknown salinity in the formation before any instability results. Mixing with brine of uncontrolled type and amount in the well can produce an unstable micellar solution before the solution even enters the formation.

Under some production it is advisable to inject a batch of relatively fresh water into the well and into the formation ahead of the micellar solution. This added step of the process should be used, particularly, when brines in the formation contain more than about 60,000 parts per million of dissolved salts. In such cases, the solubility of the formation brine in the micellar solution is so low that little of the formation brine can be dissolved by any economically feasible volume of micellar solution. Therefore, the best treatment is simply to displace the water back away from the well where it is trapped in the same way it has been trapped near the well bore.

The relatively fresh water is completely compatible and miscible with the high-salinity brine in the formation. The micellar solution is completely compatible and miscible with the relatively fresh water. Therefore, a complete miscible displacement of water away from the well takes place. The relatively fresh water may contain a little salt, for example, 4,000 or 5,000 parts per million of sodium chloride to improve compatibility with the micellar solution. If a brine having about 10,000 parts per million salt is added to the concentrate before injection into the well, however, no salt is required in the batch of relatively fresh water. Use of a little salt in the water is usually also advisable to decrease adverse effects on water-sensitive clays. For our purposes, a "relatively fresh water" should be defined as one containing up to about 15,000 parts per million by weight of dissolved salts.

Use of a batch of relatively fresh water ahead of other liquids in the process is particularly advantageous if a water cone is present. In such a case, continuous flow channels are present through which water flows from the water-bearing salt through the cone and into the well. The batch of relatively fresh water miscibly displaces the formation water in the cone back through these flow channels into the water-bearing zone. The batch of substantially aliphatic hydrocarbon liquid then displaces most of the relatively fresh water through these same channels, leaving only a small amount of relatively fresh water to be displaced or absorbed by the micellar solution or concentrate.

Frequently, or even usually, the exact nature of the problem is not known. Reduced oil production may be due to water in any of various forms, such as water cones, emulsions, isolated droplets in oil-wet pores, or the like. Reduced oil production may also be due to paraffin, asphaltenes, scale deposits, finely divided solids, or the like. Many of these plugging materials require treatments which are not easily combined with our process. However, a step for removing organic deposits, such as paraffin, is easily combined with our process.

Aromatic hydrocarbon liquids are good solvents for organic deposits. As previously mentioned, these aromatic hydrocarbon liquids tend to cause instability of micellar solutions. For this reason, only very limited amounts should be used in the micellar solution or in the liquid hydrocarbon spearhead ahead of the micellar solution. However, another advantage of our spearhead of substantially aliphatic hydrocarbon liquid is that it permits use of a batch of aromatic hydrocarbon liquid ahead of the aliphatic hydrocarbon liquid. The aromatic hydrocarbon liquid dissolves organic deposits and is then displaced by the aliphatic hydrocarbon liquid. The micellar solution which follows is thus protected from the effects of the aromatic liquid. If a petroleum fraction is used as the aromatic hydrocarbon liquid, it should contain at least about 10 percent and preferably at least about 30 percent aromatics if it is to be very effective as a solvent for organic deposits.

Better organic solvents, such as carbon disulfide, can be used in place of the aromatic hydrocarbon liquid. The spearhead batch of aliphatic hydrocarbon liquid also protects the micellar solution from any adverse effects of such solvents.

It is important to note at this point that failure of water-removal treatments should frequently be expected. As explained above, the reason for reduced oil production by a well usually is not known. If this reduction is not due to water, or is only partly due to water, it should not be surprising if the water-removal process gives little or no increase in oil production. Combination of the process with a step for removing organic deposits increases the chances for success.

In our process, the micellar solution is preceded into the well and formation by a batch of substantially aliphatic hydrocarbon liquid. The micellar solution preferably is also followed into the well by a batch of this hydrocarbon liquid. This batch of low-viscosity substantially aliphatic hydrocarbon liquid is then displaced down the well and into the formation by other oil which is usually crude oil from the formation being treated. Gas or other displacing fluids can also sometimes be used for this displacement. If a gas is used, a pad of oil between the gas and micellar solution is advisable to improve displacement of the micellar solution in the formation. The gas should also preferably be soluble in the formation oil to avoid reduction of permeability to oil due to gas saturation. Examples are methane and carbon dioxide. Most crude oils are compatible and miscible with most micellar solutions. The pad of low-viscosity substantially aliphatic hydro-carbon liquid between the micellar solution and crude oil is simply a precaution against any unexpected adverse effects of mixing the crude oil with the micellar solution.

In selecting volumes of the various liquids to inject, two basic observations should be used as a guide. One observation is that treatment of the zone as little as 3 feet from the well bore can produce considerable benefits. The other is that treatment of the zone extending much beyond about 10 feet from the well bore ordinarily produces only a small additional amount of improvement. To save cost, volumes are ordinarily used which treat to a distance of only 4 or 5 feet from the well. This requires injection of from about 1 to 5 barrels per vertical foot of treated well bore, depending on the porosity of the formation. When reference is made to a barrel, one containing 42 U. S. gallons is intended. All of this volume need not be micellar solution, since the trailing edge of the micellar solution is preferably displaced by following oil to a distance of at least a foot or two from the well bore. Usually, the volume of micellar solution is between about 0.5 and about 5 barrels per foot of treated well bore. In unusual cases, the volume may be as little as about 0.2 or as much as about 20 barrels per foot of treated well bore.

The volumes of oil and relatively fresh water injected ahead of the micellar solution can vary between wide limits, depending upon the circumstances. If the formation is to be treated to a distance of only a few feet from the well bore, these volumes of oil and water may be small, such as one barrel per vertical foot of treated well bore. In other cases, such as where highly saline water is being displaced away from the well bore, the volumes of injected water and oil may amount to 10, 20 or even 30 barrels per vertical foot of treated well bore.

The distance to which the trailing edge of the micellar solution is displaced from the well may vary from none at all in cases of treatments close to the well bore to distances of 15 or 20 feet requiring as much as 30 or 40 barrels of displacing liquid per vertical foot of well treated in cases where highly saline water is displaced far out away from the well. As noted before, the oil-producing ability of a formation is helped little by removal of water from the zone more than about 10 feet from the well. It follows that the oil-producing ability is damaged little by displacing water into this zone.

Our process will be better understood from the following example.

EXAMPLE 1

A well in Wyoming initially produced about 300 barrels of oil per day. Production declined over the years in what was considered to be a normal manner to about 100 barrels per day. Production then began declining more rapidly than it should until the well was producing only about 4 barrels of oil per day. It was also producing about 22 barrels of water per day. Emulsion problems were so severe that emulsions plugged the flow line on two occasions. The oil-bearing zone of the formation was oil-wet, so a waterblock was suspected. For this reason, the following treatment was used:

First, the well was pumped off.

Second, 28 barrels of kerosene were injected down the tubing-casing annulus.

Next, 87.5 barrels of micellar solution were injected.

This was followed by another 28-barrel batch of kerosene.

These liquids were displaced with 220 barrels of native crude oil.

This is the volume of the casing-tubing annulus.

The well was then shut-in overnight.

Next day, it was put on production.

The treated portion of the formation was 28 feet thick. The micellar solution contained 70 barrels of the concentrate shown in Table I and 17.5 barrels of fresh Platte River water containing 73.5 pounds of dissolved sodium chloride (salinity of about 12,000 parts per million).

Porosity of the formation was about 13 percent (average). Viscosity of formation oil was about 25 centipoises at bottomhole temperature, and the salinity of formation brine was about 3,000 parts per million. Well production after treatment is shown in Table VIII.

TABLE VIII

| Days After Treatment | Production, Barrels per day | |
|---|---|---|
| | OIL | WATER |
| 1 | 45 | 91 |
| 2 | 32 | 96 |
| 3 | 32 | 98 |
| 4 | 35 | 81 |
| 16 | 21 | 75 |
| 34 | 21 | 74 |
| 36 | 14 | 46 |
| 37 | 20 | 52 |
| 60 | 8 | 32 |
| 61 | 7 | 28 |
| 66 | 13 | 31 |
| (Changed Pump) | | |
| 70 | 37 | 84 |
| 71 | 26 | 90 |
| 72 | 13 | 74 |
| 73 | 14 | 72 | the note regarding the changed pump is simply to explain the temporary increase in production when the well was shut-in to change pumps. Since production before treatment was down to 4 barrels of oil and 22 barrels of water per day, it is apparent that the productivity of both oil and water was increased. This could be due to removing a waterblock in the oil zone and an oil block in the water zone. It is believed, however, that the increase was due to removal of an emulsion from the formation. The reason for this conclusion is that severe emulsion problems were present before the treatment, but, for about two months after the treatment, there was no emulsion problem in produced liquids. Then, emulsion problems began to reappear. Whatever the explanation, it is obvious that the treatment increased oil production.

If the lack of emulsion for two months was due to the micellar solution being trapped in the formation, and being fed slowly back to the well to eliminate emulsion problems, another treatment with minor variations would seem to be in order. In this treatment, the volume of micellar solution might be increased to increase the amount trapped and thus extend the treating time. A more effective variation for this purpose would seem to be to displace the micellar solution considerably farther back into the formation with at least 20, or preferably even more, barrels of oil per foot of treated formation.

EXAMPLE 2

A well was completed at about 10,370 feet in Louisiana. The gross sand thickness was about 6 feet but the actual producing zone of the formation was only about 3 feet thick. Initial production was about 130 barrels of oil per day flowing. After about 3 years, a pump became necessary. In the meantime, some problems with paraffin and with emulsions had developed possibly due to the initiation of waterflooding. About a year and a half after installing the pump, production had dropped to about 20 barrels per day of oil even after a hot oil squeeze. While repairing parted rods, the formation was treated with 2,000 gallons of mixed propane and butane. Afterward, the well production was erratic ending at about 2 barrels per day. The well was then shut in, the rods and pump were pulled and a bottom-hole pressure survey was run. Bottom-hole pressure was 1,720 pounds per square inch. Therefore, it was obvious that adequate formation pressure was present, but a restriction of some sort prevented rapid flow of oil to the well. From the history of the well, this could be paraffin, water, or salt. Much of the problem was thought to be due to salt water used in workover attempts. This would seem to make the well a good subject for treatment with a micellar solution. However, the formation water had a salinity of about 120,000 parts per million. Therefore, it had very little solubility in micellar solutions. For this reason, it was decided to use a technique to displace the water away from the well rather than trying to absorb it. The following process was used.

First, 65 barrels (42 U. S. gallons per barrel) of fresh water, containing about 3,000 parts per million of sodium chloride, were injected. The sodium chloride was added to prevent any possible damage arising from clay dispersion.

Second, 65 barrels of crude oil from the formation was injected. The crude oil had a gravity of about 34° API and a fairly low viscosity at surface conditions. At the formation temperature of about 212° F, the viscosity of the oil was, of course, very low. This permitted use of the crude oil rather than a refined petroleum fraction as the spearhead of oil ahead of the micellar solution.

Next, 14 barrels of a micellar solution were injected. This solution contained 50 percent by volume of the concentrate of Table I and 50 percent fresh water with 10,000 parts per million sodium chloride added. This high-water micellar solution was used for efficient water displacement.

Then, 15 barrels of another micellar solution were injected. This solution contained 80 percent of the same concentrate and 20 percent water containing 12,000 parts per million sodium chloride. This low-water solution was used for efficient absorption of any water unswept by the first micellar solution.

The second micellar solution was displaced into the formation by injecting 100 barrels of crude oil into the well. The volume of oil remaining in the well was about 18 barrels which means that about 82 barrels were displaced into the formation behind the micellar solution.

The well was then shut in and left for two days because of hurricane warnings.

Finally, the rods and pump were rerun and the well was put back on production about 4 days after the treatment. Available production figures are shown in Table IX.

TABLE IX

| Days After Treatment | Oil Production, Barrels per day | Days After Treatment | Oil Production, Barrels per day |
|---|---|---|---|
| 5 | 79 | 30 | 108 |
| 6 | 115 | 31 | 112 |
| 7 | 117 | 32 | 119 |
| 8 | 105 | 33 | 120 |
| 9 | 111 | 34 | 132 |
| 10 | 113 | 35 | 116 |
| 11 | 114 | 36 | 110 |
| 12 | 113 | 37 | 115 |
| 13 | 123 | 38 | 117 |
| 14 | 118 | 39 | 116 |
| 15 | 98 | 40 | 118 |
| 16 | 110 | 41 | 117 |
| 17 | 107 | 42 | 95 |
| 18 | 108 | 43 | 118 |
| 19 | 100 | 44 | 115 |
| 20 | 105 | 45 | 114 |
| 21 | 119 | 46 | 100 |
| 22 | 76 | 47 | 93 |
| 23 | 106 | 48 | 88 |
| 24 | 102 | 49 | 90 |
| 25 | 110 | 50 | 65 |
| 26 | 105 | 51 | 95 |
| 27 | 112 | 52 | 91 |
| 28 | 108 | 53 | 90 |
| 29 | 110 | 54 | 90 |

The production figures in Table IX show that the treatment was effective in displacing water far enough away from the well that it no longer seriously restricted flow of oil to the well.

Several materials, volumes, concentrations, and the like, are described above. Some alternates and ranges are given. Other equivalents and variations will be apparent to those skilled in the art. Therefore, we do not wish to be limited to the examples described above, but only by the following claims.

We claim:

1. In a process for removing water from the portion of an oil-producing formation near an oil-producing well penetrating said formation, in which process a micellar solution is injected through the well and into the oil-bearing formation to displace and absorb water, and in which the well is then returned to production, the improvement comprising injection through said well and into said formation ahead of said micellar solution a batch of low-viscosity substantially aliphatic hydrocarbon liquid, the water content of said micellar solution ranging from about 20 volume percent to slightly in excess of 50 volume percent of said solution, and thereafter producing said well.

2. The process of claim 1 in which the water content of said solution ranges from about 20 to about 30 volume percent of said solution.

3. The process of claim 2 in which said substantially aliphatic hydrocarbon liquid is a petroleum fraction having a viscosity of less than about 100 centipoises, a flashpoint above about 80° F, and an aromatics content less than 5 percent by volume.

4. The process of claim 2 in which a batch of water containing less than about 15,000 parts per million by weight of dissolved salts is injected through said well and into said formation ahead of said substantially aliphatic hydrocarbon liquid.

5. The process of claim 4 in which said salts consist essentially of sodium chloride.

6. The process of claim 2 in which a batch of a solvent for organic well deposits is injected through said well and into said formation ahead of said substantially aliphatic hydrocarbon liquid.

7. The process of claim 6 in which said solvent is a petroleum fraction containing at least 5 percent by volume of aromatics.

8. The process of claim 2 in which water in the formation contains at least about 20,000 parts per million of dissolved salts.

9. The process of claim 1 in which water in the formation contains at least about 60,000 parts per million of dissolved salts and in which a batch of water containing less than about 15,000 parts per million by weight of dissolved salts is injected through said well and into said formation ahead of said substantially aliphatic hydrocarbon liquid.

10. The process of claim 2 in which said micellar solution is transparent, the oil phase is a substantially aliphatic hydrocarbon liquid, the water phase has a salt content of from about 6,000 to about 15,000 parts per million by weight, the principal surfactant is a petroleum alkali metal sulfonate having an average molecular weight of from about 425 to about 575, a cosurfactant is employed which is a mixture of a 2 to 12 mole ethylene oxide adduct of a primary unsubstituted monohydric alcohol having from four to 10 carbon atoms and an unsubstituted monohydric oil-soluble alcohol having from four to six carbon atoms, the weight ratio of principal surfactant to mixed cosurfactants is from about 2.5:1 to about 10:1, the weight ratio of ethylene oxide adduct to oil-soluble alcohol is from about 1:1 to about 9:1, the oil content is at least about 50 percent of the weight of the concentrate made up of ingredients other than the salt water, and the salt water content of the micellar solution is from about 10 to a little over 100 percent of the volume of said water-free concentrate.

11. The process of claim 2 in which said micellar solution is displaced into said formation with at least about 20 barrels of oil for each foot of thickness of treated formation whereby at least some of said micellar solution remains in said formation for an extended period of time to decrease emulsification of oil and water in the formation.

* * * * *

UNITED STATES PATENT OFFICE
CERTIFICATE OF CORRECTION

Patent No. 3,783,945                     Dated    January 8, 1974

Inventor(s)  Dwight L. Dauben and H R. Froning

It is certified that error appears in the above-identified patent and that said Letters Patent are hereby corrected as shown below:

Column 5, line 17, "petroleum kerosene, such as kerosens," should read -- petroleum fraction, such as kerosene, --;

line 47, Table III, (last line), below "50% Lub. Oil" should appear -- 50% Stoddard --;

line 53, after "brines", "are" should read -- was --.

Column 6, line 14, "milliters" should read -- milliliters --.

Column 9, line 68, "production" should read -- conditions --.

Column 15, Claim 9, the first line, "claim 1" should read -- claim 2 --.

Signed and sealed this 23rd day of July 1974.

(SEAL)
Attest:

McCOY M. GIBSON, JR.
Attesting Officer

C. MARSHALL DANN
Commissioner of Patents